(12) United States Patent
Zhu et al.

(10) Patent No.: US 11,990,964 B2
(45) Date of Patent: May 21, 2024

(54) CHANNEL STATE INFORMATION REPORT CALCULATION

(71) Applicant: LENOVO (BEIJING) LIMITED, Beijing (CN)

(72) Inventors: Chenxi Zhu, Beijing (CN); Bingchao Liu, Beijing (CN); Wei Ling, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 586 days.

(21) Appl. No.: 17/275,137

(22) PCT Filed: Sep. 26, 2018

(86) PCT No.: PCT/CN2018/107734
§ 371 (c)(1),
(2) Date: Mar. 10, 2021

(87) PCT Pub. No.: WO2020/061852
PCT Pub. Date: Apr. 2, 2020

(65) Prior Publication Data
US 2022/0052733 A1 Feb. 17, 2022

(51) Int. Cl.
*H04B 7/06* (2006.01)
*H04B 17/327* (2015.01)
(Continued)

(52) U.S. Cl.
CPC ......... *H04B 7/0626* (2013.01); *H04B 17/327* (2015.01); *H04L 5/0048* (2013.01); *H04L 5/0057* (2013.01); *H04W 24/10* (2013.01)

(58) Field of Classification Search
CPC ... H04B 7/0626; H04B 17/327; H04L 5/0048; H04L 5/0057; H04W 24/10
See application file for complete search history.

(56) References Cited

U.S. PATENT DOCUMENTS

2018/0227031 A1 8/2018 Guo et al.
2018/0262313 A1 9/2018 Nam et al.
(Continued)

FOREIGN PATENT DOCUMENTS

CN  104303544 A   1/2015
WO  2013145552 A1 10/2013
(Continued)

OTHER PUBLICATIONS

LG Electronics, Discussion on enhancements for non-coherent JT, 3GPP TSG RAN WG1 Meeting #86, R1-166865, Aug. 22-26, 2016, pp. 1-2, Gothenburg, Sweden.
(Continued)

*Primary Examiner* — Kent Krueger
(74) *Attorney, Agent, or Firm* — Kunzler Bean & Adamson

(57) ABSTRACT

Apparatuses, methods, and systems are disclosed for channel state information report calculation. One method (700) includes receiving (702) configuration information for multiple channel state information reference signal resources. The method (700) includes determining (704) two channel state information reference signal resources of the multiple channel state information reference signal resources to be used for calculating a channel state information report. The two channel state information reference signal resources are received from different transmission reception points, different panels, or a combination thereof. In certain embodiments, the method (700) includes transmitting (706) the channel state information report calculated based on the two channel state information reference signal resources.

20 Claims, 8 Drawing Sheets

(51) Int. Cl.
    *H04L 5/00*         (2006.01)
    *H04W 24/10*      (2009.01)

(56)                References Cited

U.S. PATENT DOCUMENTS

2019/0053072 A1\*   2/2019   Kundargi .............. H04W 16/28
2020/0267571 A1\*   8/2020   Park ..................... H04L 5/0051

FOREIGN PATENT DOCUMENTS

WO       2013145787 A1    10/2013
WO       2013169086 A1    11/2013

OTHER PUBLICATIONS

International Searching Authority, "Notification of Transmittal of the International Search Report and the Written Opinion of the International Searching Authority, or the Declaration", PCT/CN2018/107734, dated Sep. 26, 2018, pp. 1-7.

\* cited by examiner

CHANNEL STATE INFORMATION REPORT CALCULATION

FIELD

The subject matter disclosed herein relates generally to wireless communications and more particularly relates to channel state information report calculation.

BACKGROUND

The following abbreviations are herewith defined, at least some of which are referred to within the following description: Third Generation Partnership Project ("3GPP"), Broadcast Multicast ("BM"), Base Station ("BS"), Bandwidth Part ("BWP"), Component Carrier ("CC"), Coordinated Multipoint ("CoMP"), CSI-RS Resource Indicator ("CRI"), Channel State Information ("CSI"), Channel Quality Indicator ("CQI"), Codeword ("CW"), Downlink ("DL"), Demodulation Reference Signal ("DMRS"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Long Term Evolution ("LTE"), Multiple Input Multiple Output ("MIMO"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Network ("PDN"), Protocol Data Unit ("PDU"), Public Land Mobile Network ("PLMN"), Precoding Matrix Indicator ("PMI"), Packet Switched ("PS"), Quasi Co-Located ("QCL"), Quality of Service ("QoS"), Radio Access Network ("RAN"), Radio Access Technology ("RAT"), Resource Element ("RE"), Rank Indicator ("RI"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Subscriber Identity Module ("SIM"), Signal-to-Interference and Noise Ratio ("SINR"), Synchronization Signal ("SS"), SS/PBCH Block ("SSB"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Universal Mobile Telecommunications System ("UMTS"), Universal Subscriber Identity Module ("USIM"), Universal Terrestrial Radio Access Network ("UTRAN"), Voice Over IP ("VoIP"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, multiple beams may be used. In such networks, certain beams may be transmitted concurrently.

BRIEF SUMMARY

Methods for channel state information report calculation are disclosed. Apparatuses and systems also perform the functions of the apparatus. In one embodiment, the method includes receiving configuration information for multiple channel state information reference signal resources. In various embodiments, the method includes determining two channel state information reference signal resources of the multiple channel state information reference signal resources to be used for calculating a channel state information report. In such embodiments, the two channel state information reference signal resources are received from different transmission reception points, different panels, or a combination thereof. In certain embodiments, the method includes transmitting the channel state information report calculated based on the two channel state information reference signal resources.

An apparatus for channel state information report calculation, in one embodiment, includes a receiver that receives configuration information for multiple channel state information reference signal resources. In various embodiments, the apparatus includes a processor that determines two channel state information reference signal resources of the multiple channel state information reference signal resources to be used for calculating a channel state information report. In such embodiments, the two channel state information reference signal resources are received from different transmission reception points, different panels, or a combination thereof. In some embodiments, the apparatus includes a transmitter that transmits the channel state information report calculated based on the two channel state information reference signal resources.

In one embodiment, a method for receiving a channel state information report includes transmitting configuration information for multiple channel state information reference signal resources. In various embodiments, the method includes receiving a channel state information report calculated based on two channel state information reference signal resources of the multiple channel state information reference signal resources that are used for calculating the channel state information report. In such embodiments, the two channel state information reference signal resources are transmitted from different transmission reception points, different panels, or a combination thereof.

An apparatus for receiving a channel state information report, in one embodiment, includes a transmitter that transmits configuration information for multiple channel state information reference signal resources. In various embodiments, the apparatus includes a receiver that receives a channel state information report calculated based on two channel state information reference signal resources of the multiple channel state information reference signal resources that are used for calculating the channel state information report. In such embodiments, the two channel state information reference signal resources are transmitted from different transmission reception points, different panels, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
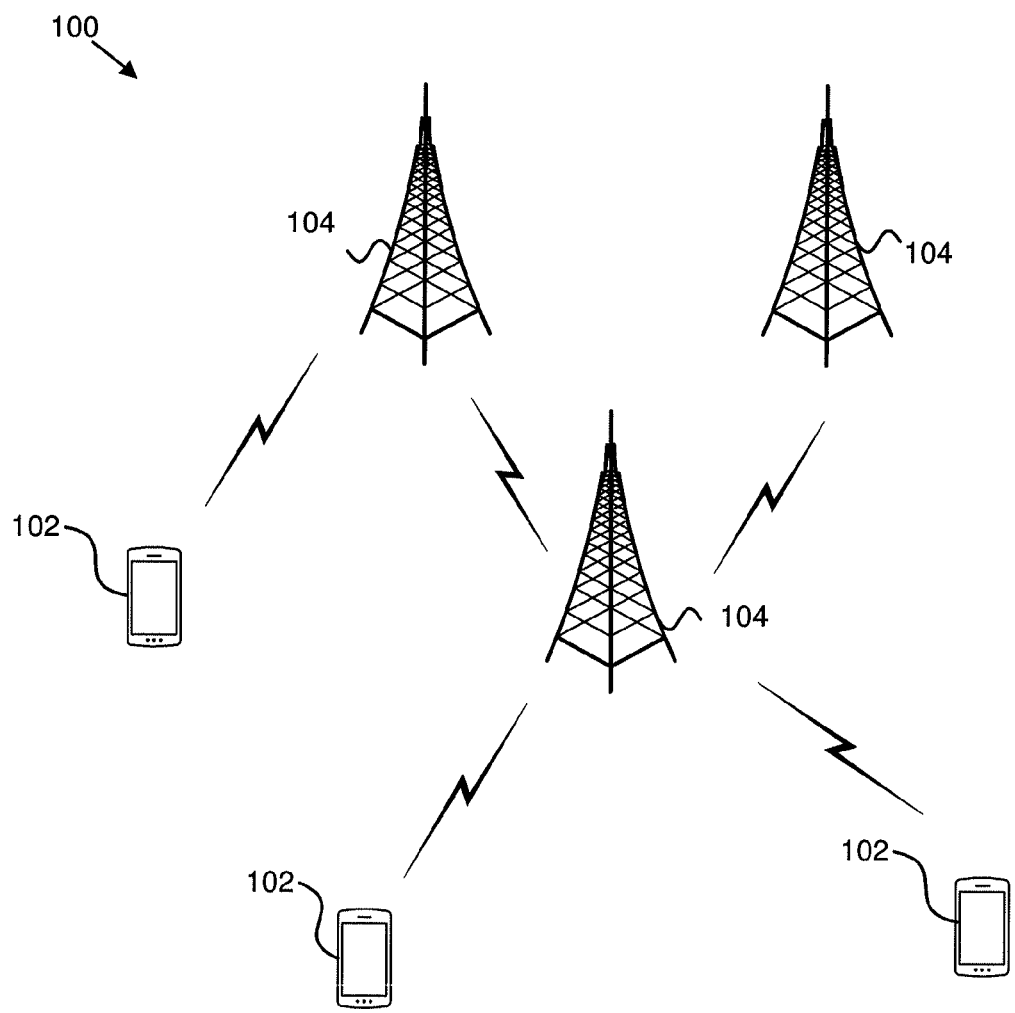
FIG. 1 is a schematic block diagram illustrating one embodiment of a wireless communication system for channel state information report calculation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for channel state information report calculation. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive configuration information for multiple channel state information reference signal resources. In various embodiments, the remote unit 102 may determine two channel state information reference signal resources of the multiple channel state information reference signal resources to be used for calculating a channel state information report. In such embodiments, the two channel state information reference signal resources are received from different transmission reception points, different panels, or a combination thereof. In certain embodiments, the remote unit 102 may transmit the channel state information report calculated based on the two channel state information reference signal resources. Accordingly, a remote unit 102 may be used for channel state information report calculation.

In certain embodiments, a network unit 104 may transmit configuration information for multiple channel state information reference signal resources. In various embodiments, the network unit 104 may receive a channel state information report calculated based on two channel state information reference signal resources of the multiple channel state information reference signal resources that are used for calculating the channel state information report. In such embodiments, the two channel state information reference signal resources are transmitted from different transmission reception points, different panels, or a combination thereof. Accordingly, a network unit 104 may be used for receiving a channel state information report.

Figure 2:
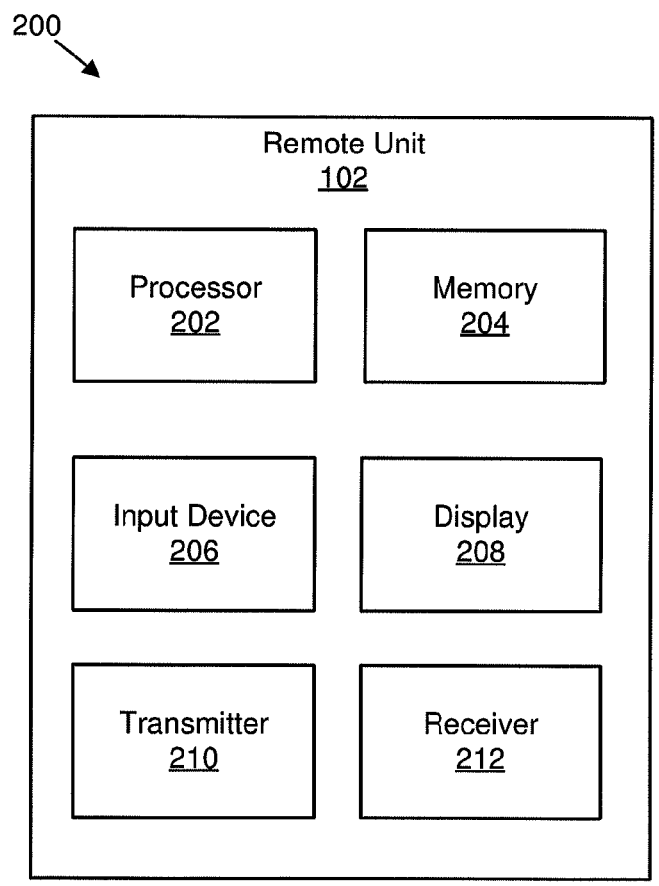
FIG. 2 is a schematic block diagram illustrating one embodiment of an apparatus that may be used for channel state information report calculation.

FIG. 2 depicts one embodiment of an apparatus 200 that may be used for channel state information report calculation. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine two channel state information reference signal resources of multiple channel state information reference signal resources to be used for calculating a channel state information report. In such embodiments, the two channel state information reference signal resources may be received from different transmission reception points, different panels, or a combination thereof. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 may receive configuration information for multiple channel state information reference signal resources. In certain embodiments, the transmitter 210 may transmit a channel state information report calculated based on two channel state information reference signal resources. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
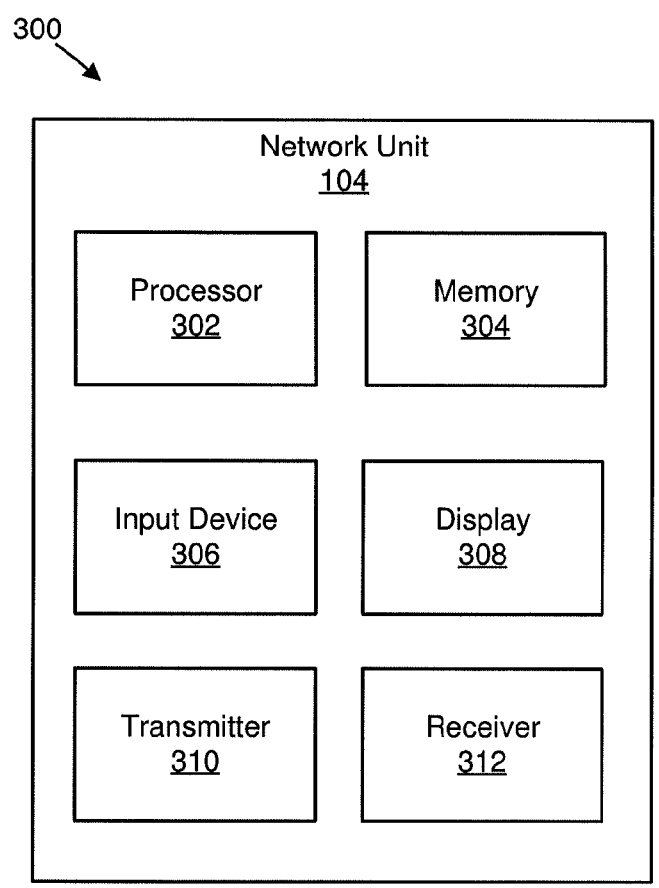
FIG. 3 is a schematic block diagram illustrating one embodiment of an apparatus that may be used for receiving a channel state information report.

FIG. 3 depicts one embodiment of an apparatus 300 that may be used for receiving a channel state information report. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 transmits configuration information for multiple channel state information reference signal resources. In certain embodiments, the receiver 312 receives a channel state information report calculated based on two channel state information reference signal resources of the multiple channel state information reference signal resources that are used for calculating the channel state information report. In such embodiments, the two channel state information reference signal resources are transmitted from different transmission reception points, different panels, or a combination thereof.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain configurations, such as in LTE, multi-TRP transmission may be supported as CoMP transmission. In various configurations, such as in LTE CoMP transmission mode 10, a remote unit 102 may be configured with multiple NZP-CSI-RS resources. In some embodiments, an NZP-CSI-RS process includes an NZP-CSI-RS process as a DL transmission signal and another zero power CSI resource for interference measurement. In one embodiment, non-coherent joint transmission is supported. In non-coherent joint transmission a CSI process may be configured with 2 NZP-CSI-RS resources that are not QCL with each other, and one CSI-IM resource. In certain embodiments, a network unit 104 may configure multiple CSI processes for the remote unit 102 to provide CSI feedback, and may decide which transmission points and ports to use for DL transmission. In such embodiments, the TRP and NZP-CSI-RS resource selection is by the network unit 104, and the remote unit 102 may only need to provide CSI feedback with its configured CSI process.

In some configurations, such as in LTE, a network may be designed to operate in a low frequency band, while in other configurations, such as NR, the network may be designed to support to 52.6 GHz frequency well into a millimeter wave range.

In various configurations, a remote unit 102 may provide L1-RSRP measurement on BM-CSI-RS to a network unit 104, and the network unit 104 may decide which single beam to use for transmission to the remote unit 102 based only on the RSRP measurement. Such configurations may not support transmission from multiple TRP or using multiple beams. Moreover, in such configurations, based on the selected beam, the network unit 104 may configure additional NZP-CSI-RS resources for the remote unit 102 to provide CSI feedback.

In some configurations, an NZP-CSI-RS resource may be configured as QCL with respect to another NZP-CSI-RS or an SSB. In such configurations, for an NZP-CSI-RS, a field qcl-InfoPeriodicCSI-RS may contain a reference to a TCI-State indicating QCL source RS(s). If the TCI-State is configured with a reference to an RS with 'QCL-TypeD' association, that RS may be an SS/PBCH block located in the same or different CC/DL BWP or an NZP-CSI-RS resource configured as periodic located in the same or different CC/DL BWP. When analog beamforming is used, it may imply that the same analog beaming vector is applied to both the NZP-CSI-RS and the reference NZP-CSI-RS or SSB.

In certain embodiments, for joint transmission, a network unit 104 may transmit to a remote unit 102 in a single PDSCH using two DL beams from two TRPs or two panels. A CSI report may be transmitted from the remote unit 102 for the network unit 104 to decide which beams and precoders to use for transmission from the network unit 104. With certain configurations, such as NR that supports high frequencies with beamforming, a number of possible combinations of resources to use for the transmission may be large. If a remote unit 102 transmits a CSI report for all possible combinations of resources, both signaling overhead and CSI feedback overhead will be large using an excessive number of resources. In some embodiments, to reduce the overhead, the remote unit 102 may be used to determine which resource (e.g., NZP-CSI-RS resource, CRI) combination to include in its feedback. In various embodiments, the remote unit 102 may be configured from multiple candidate NZP-CSI-RS resources for CSI acquisition, possibly from different TRPs or different antenna panels with different transmission beams. In such embodiments, the remote unit 102 may select multiple NZP-CSI-RS resources from the configured NZP-CSI-RS resources to calculate a joint CSI with CRIs.

In various embodiments, in response to a network unit 104 configuring multiple NZP-CSI-RS resources for a remote unit 102 to provide feedback for joint transmission, the remote unit 102 may select two CRIs to use for downlink JT. The two CRIs may be selected to provide a highest capacity, assuming up to two codewords will be transmitted in the DL. After deciding which NZP-CSI-RS resources to use, the remote unit 102 may derive CSI with the JT assumption in which two CWs are transmitted from different NZP-CSI-RS resources. The order for the remote unit 102 to compute the CSI is as follows: 2 CRIs→2 RIs→2 PMIs→2 CQIs.

Accordingly, the remote unit 102 may need to determine the two NZP-CSI-RS resources (e.g., two CRIs) first. To do this, the remote unit 102 may need to know which NZP-CSI-RS resources can be transmitted simultaneously. Therefore, information may be transmitted to the remote unit 102 (e.g., from the network unit 104) to indicate to the remote unit 102 know which pairs of NZP-CSI-RS resources can be transmitted simultaneously.

Figure 4:
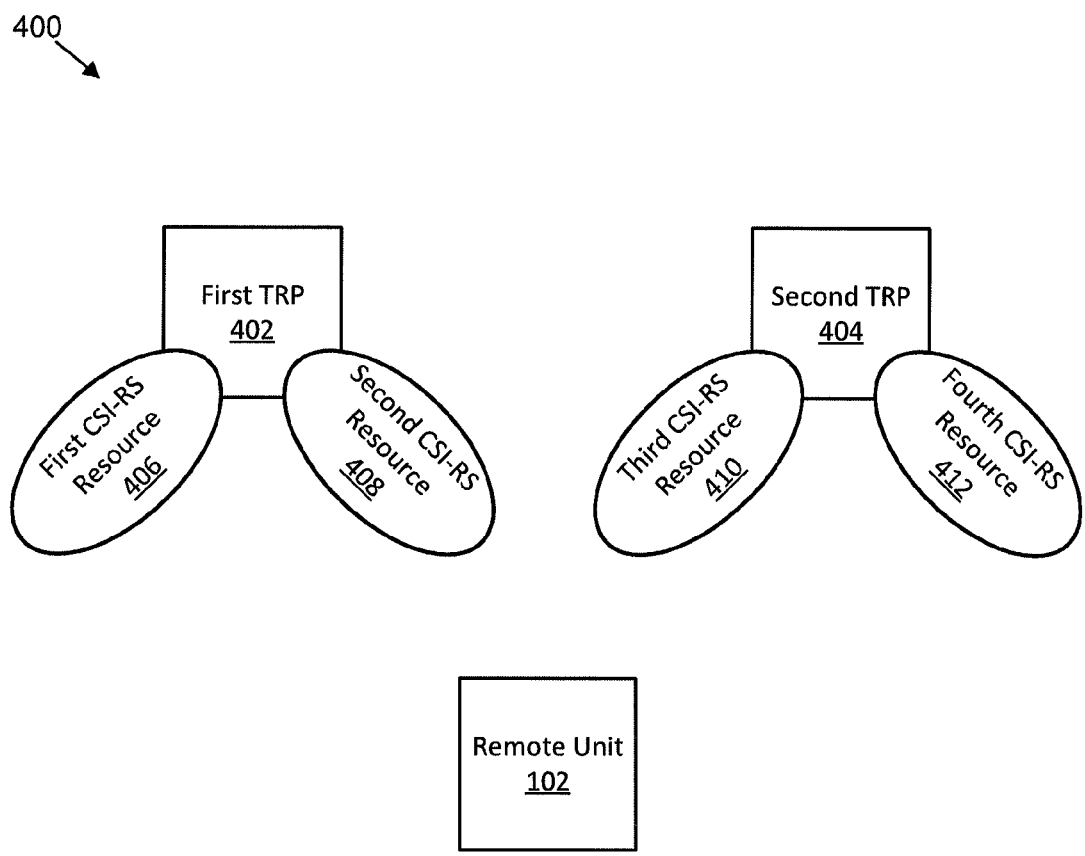
FIG. 4 is a schematic block diagram illustrating one embodiment of a system that includes transmission of beams from two TRPs.

FIG. 4 is a schematic block diagram illustrating one embodiment of a system 400 that includes transmission of beams (e.g., JT) from two TRPs. The system 400 includes a first TRP 402 (e.g., TRP1), a second TRP 404 (e.g., TRP2), and the remote unit 102. As may be appreciated, the first TRP 402 and/or the second TRP 404 may be embodiments of the network unit 104. The first TRP 402 transmits a first CSI-RS resource 406 (e.g.,NZP-CSI-RS1) using a first TX beam, and a second CSI-RS resource 408 (e.g., NZP-CSI-RS2) using a second TX beam. Moreover, the second TRP 404 transmits a third CSI-RS resource 410 (e.g., NZP-CSI-RS3) using a first TX beam, and a fourth CSI-RS resource 412 (e.g., NZP-CSI-RS4) using a second TX beam.

From the first TRP 402, beam management resources NZP-CSI-RS1 and NZP-CSI-RS2 are transmitted with different TX beams, so they cannot be transmitted simultaneously. Furthermore, from the second TRP 404, beam management resources NZP-CSI-RS3 and NZP-CSI-RS4 are transmitted with different TX beams, so they cannot be transmitted simultaneously.

In certain embodiments, one way to indicate to the remote unit 102 which resources can be transmitted simultaneously is to inform the remote unit 102 about which SSB and/or CSI-RS resources cannot be transmitted simultaneously. This can be done by defining a set of mutually-exclusive RS resources ("ExSet") via RRC. With this type of definition, SSB and/or CSI-RS resources in the same ExSet cannot be transmitted simultaneously, while CSI-RS and/or SSB in different ExSets can be transmitted simultaneously. For one example based on FIG. 4, two ExSets can be defined: ExSet1=(NZP-CSI-RS1, NZP-CSI-RS2), ExSet2=(NZP-CSI-RS3, NZP-CSI-RS4).

In some embodiments, defining sets of ExSet may become cumbersome as a result of QCL transmissions. This is illustrated in FIG. 5, where CSI acquisition CSI-RS resources are transmitted using the same beam as the beam management RS.

Figure 5:
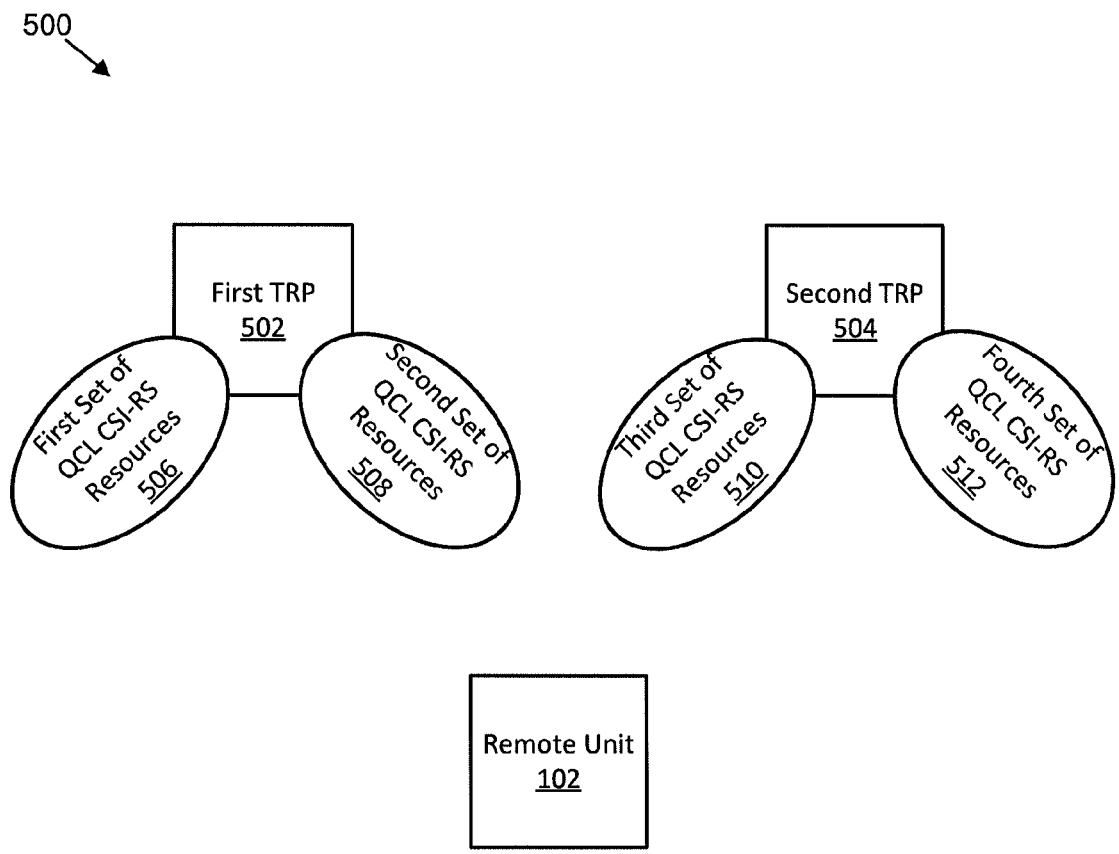
FIG. 5 is a schematic block diagram illustrating one embodiment of a system that includes transmission of QCL beams from two TRPs.

FIG. 5 is a schematic block diagram illustrating one embodiment of a system 500 that includes transmission (e.g., JT) of QCL beams from two TRPs. The system 500 includes a first TRP 502 (e.g., TRP1), a second TRP 504 (e.g., TRP2), and the remote unit 102. As may be appreciated, the first TRP 502 and/or the second TRP 504 may be embodiments of the network unit 104. The first TRP 502 transmits a first set of QCL CSI-RS resources 506 (e.g., NZP-CSI-RS1, NZP-CSI-RS1', NZP-CSI-RS1") using a first TX beam, and a second set of QCL CSI-RS resources 508 (e.g., NZP-CSI-RS2, NZP-CSI-RS2', NZP-CSI-RS2") using a second TX beam. Moreover, the second TRP 504 transmits a third set of QCL CSI-RS resources 510 (e.g., NZP-CSI-RS3, NZP-CSI-RS3', NZP-CSI-RS3") using a first TX beam, and a fourth set of QCL CSI-RS resources 512 (e.g., NZP-CSI-RS4, NZP-CSI-RS4', NZP-CSI-RS4") using a second TX beam.

From the first TRP 502, CSI-RS resources NZP-CSI-RS1, NZP-CSI-RS1', and NZP-CSI-RS1" are transmitted using the same beam, or are QCL, and CSI-RS resources NZP-CSI-RS2, NZP-CSI-RS2', and NZP-CSI-RS2" are QCL. Furthermore, from the second TRP 504, CSI-RS resources NZP-CSI-RS3, NZP-CSI-RS3', and NZP-CSI-RS3" are QCL, and CSI-RS resources NZP-CSI-RS4, NZP-CSI-RS4', and NZP-CSI-RS4" are QCL. CSI-RS from the first set of QCL CSI-RS resources 506 cannot be transmitted simultaneously with CSI-RS from the second set of QCL CSI-RS resources 508. In addition, CSI-RS from the third set of QCL CSI-RS resources 510 cannot be transmitted simultaneously with CSI-RS from the fourth set of QCL CSI-RS resources 512. For example, the following pairs separated by a "/" cannot be transmitted simultaneously (e.g., concurrently): NZP-CSI-RS1/NZP-CSI-RS2; NZP-CSI-RS1/NZP-CSI-RS2'; NZP-CSI-RS1/NZP-CSI-RS2"; NZP-CSI-RS1'/NZP-CSI-RS2; NZP-CSI-RS1"/NZP-CSI-RS2'; NZP-CSI-RS3/NZP-CSI-RS4'; NZP-CSI-RS3"/NZP-CSI-RS4'; and so forth. As another example, the following sets separated by one or more "/" can be transmitted simultaneously (e.g., concurrently): NZP-CSI-RS1/NZP-CSI-RS1'/NZP-CSI-RS1"; NZP-CSI-RS2/NZP-CSI-RS2'/NZP-CSI-RS2"; NZP-CSI-RS3/NZP-CSI-RS3'/NZP-CSI-RS3"; NZP-CSI-RS4/NZP-CSI-RS4'/NZP-CSI-RS4"; NZP-CSI-RS1/NZP-CSI-RS1"/NZP-CSI-RS3/NZP-CSI-RS3/NZP-CSI-RS3"; NZP-CSI-RS1/NZP-CSI-RS1/NZP-CSI-RS1'/NZP-CSI-RS1"/NZP-CSI-RS4/NZP-CSI-RS4'/NZP-CSI-RS4"; NZP-CSI-RS2/NZP-CSI-RS2'/NZP-CSI-RS2"/NZP-CSI-RS3/NZP-CSI-RS3'/NZP-CSI-RS3"; NZP-CSI-RS2/NZP-CSI-RS2"/NZP-CSI-RS2"/NZP-CSI-RS4/NZP-CSI-RS4'/NZP-CSI-RS4"; and so forth. As may be appreciated, such a large combination of CSI-RS that can and/or cannot be transmitted simultaneously make it difficult to signal only ExSets to the remote unit 102 to indicate which CSI-RS can and/or cannot be transmitted simultaneously.

In various embodiments, to reduce the signaling complexity, a QCL assumption between RSs (e.g., CSI-RSs) can be used in addition to explicitly defining ExSets to inform the remote unit 102 which RSs can and cannot be transmitted simultaneously. In such embodiments, the QCL assumption is that RSs that are defined as QCL can be transmitted simultaneously. For example, if NZP-CSI-RS1, NZP-CSI-RS1', and NZP-CSI-RS1" are defined as being QCL, then NZP-CSI-RS1, NZP-CSI-RS1', and NZP-CSI-RS1" can be transmitted simultaneously. In certain embodiments, a simultaneous transmission property of RSs can be inherited through QCL. For example, if a $RS_x$ is RRC configured as QCL with respect to another $RS_y$, then $RS_x$ inherits the transmission property of $RS_y$. Accordingly, $RS_y$ can be transmitted simultaneously with any RS that can be transmitted simultaneously as $RS_x$. In the embodiment illustrated in FIG. 5, because NZP-CSI-RS1 can be transmitted simultaneously with NZP-CSI-RS3, if NZP-CSI-RS1' and NZP-CSI-RS1" are defined as QCL to NZP-CSI-RS1, then NZP-CSI-RS1' and NZP-CSI-RS1" can also be transmitted simultaneously with NZP-CSI-RS3.

In some embodiments, instead of defining ExSets, sets of RSs that can be transmitted simultaneously can be defined as CoSets ("co-transmission sets"). In such embodiments, the remote unit 102 may assume the RSs in a CoSet can be transmitted at the same time, while RSs in different CoSets cannot be transmitted at the same time. In the embodiment illustrated in FIG. 4, four CoSets can be defined: CoSet1=(NZP-CSI-RS1, NZP-CSI-RS3), CoSet2=(NZP-CSI-RS1, NZP-CSI-RS4), CoSet3=(NZP-CSI-RS2, NZP-CSI-RS3), CoSet4=(NZP-CSI-RS2, NZP-CSI-RS4).

Similar to other embodiments, QCL properties can be used to further define the co-transmission properties of RSs in addition to defining CoSets. That is, RSs that are defined as QCL can be transmitted simultaneously. Furthermore, the simultaneous transmission property of RSs can also be inherited through QCL. For example, if a $RS_x$ is RRC configured as QCL with respect to another $RS_y$, then $RS_x$ inherits the transmission property of $RS_y$. Accordingly, with the co-transmission property implicitly defined with the QCL properties, the effective resulting co-transmission sets become: CoSet1=(NZP-CSI-RS1/NZP-CSI-RS1'/NZP-CSI-RS1", NZP-CSI-RS3/NZP-CSI-RS3'/NZP-CSI-RS3"), CoSet2=(NZP-CSI-RS1NZP-CSI-RS1'/NZP-CSI-RS1", NZP-CSI-RS4/NZP-CSI-RS4'/NZP-CSI-RS4"), CoSet3=(NZP-CSI-RS2/NZP-CSI-RS2'/NZP-CSI-RS2", NZP-CSI-RS3/NZP-CSI-RS3'/NZP-CSI-RS3"), CoSet4=(NZP-CSI-RS2/NZP-CSI-RS2'/NZP-CSI-RS2", NZP-CSI-RS4/NZP-CSI-RS4'/NZP-CSI-RS4").

By using ExSets and/or CoSets, the remote unit 102 may learn which RSs can be transmitted simultaneously. Thus, if the remote unit 102 is configured with multiple (e.g., more than two) CSI-RS resources for channel estimation, the remote unit 102 may use this knowledge of which RSs can be transmitted simultaneously to determine which two RSs to use to calculate CSI for JT. In the embodiment illustrated in FIG. 5, if the remote unit 102 is configured with CSI acquisition resources NZP-CSI-RS1'/NZP-CSI-RS1"/NZP-CSI-RS2'/NZP-CSI-RS2"NZP-CSI-RS3'NZP-CSI-RS3"/ NZP-CSI-RS4'/NZP-CSI-RS4", the remote unit 102 may use these CSI-RS resources together with the mutually-exclusive transmission (or co-transmission) properties to determine which two CSI-RS resources to use for joint transmission, and the remote unit 102 may send the CSI feedback a network unit 104.

Figure 6:
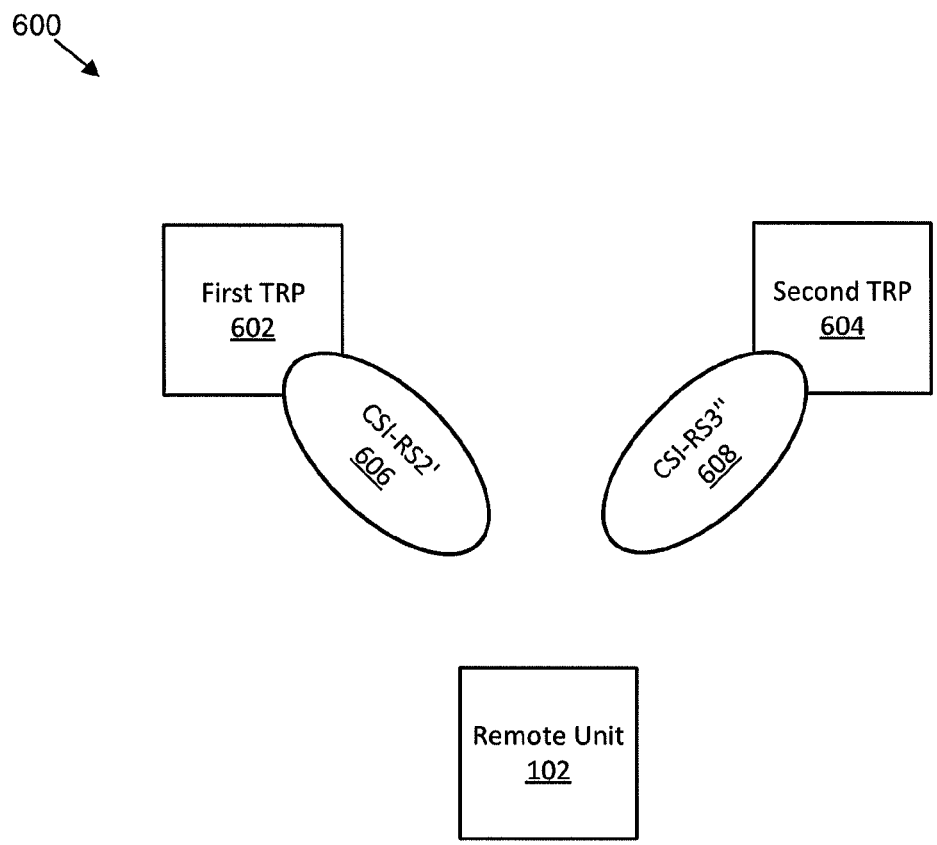
FIG. 6 is a schematic block diagram illustrating one embodiment of a system in which beams are selected by a remote unit.

FIG. 6 is a schematic block diagram illustrating one embodiment of a system 600 in which beams (e.g., JT) are selected by a remote unit 102. The system 600 includes a first TRP 602 (e.g., TRP1), a second TRP 604 (e.g., TRP2), and the remote unit 102. As may be appreciated, the first TRP 602 and/or the second TRP 604 may be embodiments of the network unit 104. The first TRP 602 transmits CSI-RS2'606 (e.g., NZP-CSI-RS2') using a second TX beam, which is a first of two CSI-RS selected by the remote unit 102. Moreover, the second TRP 604 transmits a CSI-RS3"608 (e.g., NZP-CSI-RS3") using a first TX beam, which is a second of two CSI-RS selected by the remote unit 102.

Accordingly, in FIG. 6, the remote unit 102 determines to use CSI-RS2' 606 and CSI-RS3" 608 for JT. Moreover, a first codeword is sent from CSI-RS2' 606 and a second codeword is sent from CSI-RS3" 608. Thus, the remote unit 102 may prepare and provide a CSI report as follows: CSI=(CSI-RS2', $RI_1$, $PMI_1$, $CQI_1$, CSI-RS3", $RI_2$, $PMI_2$, $CQI_2$) to a network unit 104. Therefore, two CRIs corresponds to two CWs.

In various embodiments, besides not using two NZP-CSI-RS resources that cannot be transmitted simultaneously for joint transmission in CSI feedback, a remote unit 102 may not use two NZP-CSI-RS resources that are transmitted from a same TRP using a same beam. Without having a network unit 104 explicitly signal to a remote unit 102 which NZP-CSI-RS resource is sent from which TRP using which beam, the remote unit 102 may derive this information from QCL configuration between two NZP-CSI-RS resources. Thus, if two NZP-CSI-RS resources are configured as QCL with each other, the remote unit 102 may understand that they are transmitted from the same TRP with the same beam, so the remote unit 102 should not include both of them in the same CSI report for joint transmission. For example, the remote unit 102 of FIG. 6 should not include CSI-RS resources NZP-CSI-RS1' with NZP-CSI-RS1", NZP-CSI-RS2' with NZP-CSI-RS2", NZP-CSI-RS3' with NZP-CSI-RS3", or NZP-CSI-RS4' with NZP-CSI-RS4".

Figure 7:
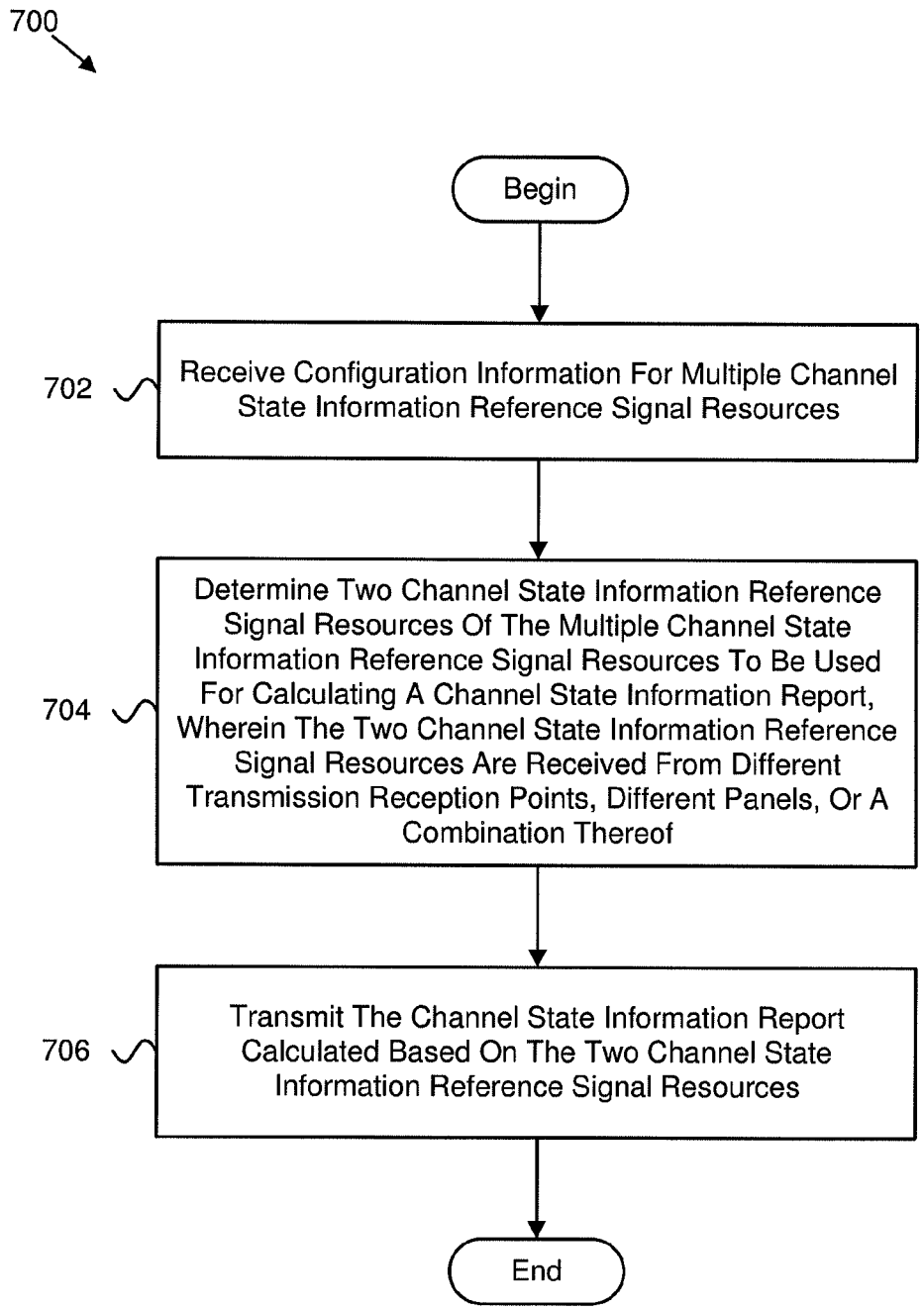
FIG. 7 is a schematic flow chart diagram illustrating one embodiment of a method for channel state information report calculation.

FIG. 7 is a schematic flow chart diagram illustrating one embodiment of a method 700 for channel state information report calculation. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 configuration information (e.g., QCL information, ExSets, CoSets, simultaneous transmission information) for multiple channel state information reference signal resources. In various embodiments, the method 700 includes determining 704 two channel state information reference signal resources of the multiple channel state information reference signal resources to be used for calculating a channel state information report. In such embodiments, the two channel state information reference signal resources are received from different transmission reception points, different panels, or a combination thereof. In certain embodiments, the method 700 includes transmitting 706 the channel state information report calculated based on the two channel state information reference signal resources.

In certain embodiments, determining the two channel state information reference signal resources includes determining that the two channel state information reference signal resources are capable of being transmitted concurrently. In some embodiments, the method 700 includes receiving information indicating which channel state information reference signal resources of the multiple channel state information reference signal resources are capable of being transmitted concurrently. In various embodiments, determining the two channel state information reference signal resources includes using quasi co-location information of the multiple channel state information reference signal resources to determine transmission properties of the multiple channel state information reference signal resources.

In one embodiment, channel state information reference signal resources of the multiple channel state information reference signal resources that are quasi co-located are capable of being transmitted concurrently. In certain embodiments, a first channel state information reference signal resource of the multiple channel state information reference signal resources that is quasi co-located with a second channel state information reference signal resource of the multiple channel state information reference signal resources inherits transmission properties of the second channel state information reference signal resource. In some embodiments, the method 700 includes receiving information indicating at least one set of channel state information reference signal resources of the multiple channel state information reference signal resources that are capable of being transmitted concurrently.

In various embodiments, determining the two channel state information reference signal resources includes determining that the two channel state information reference signal resources are capable of being transmitted concurrently based on the at least one set of channel state information reference signal resources. In one embodiment, the method 700 includes receiving information indicating at least one set of channel state information reference signal resources of the multiple channel state information reference signal resources that are incapable of being transmitted concurrently. In certain embodiments, determining the two channel state information reference signal resources includes determining that the two channel state information reference signal resources are capable of being transmitted concurrently based on the at least one set of channel state information reference signal resources.

In some embodiments, the multiple channel state information reference signal resources are non-zero power channel state information reference signal resources. In various embodiments, the two channel state information reference signal resources are not quasi co-located with each other.

Figure 8:
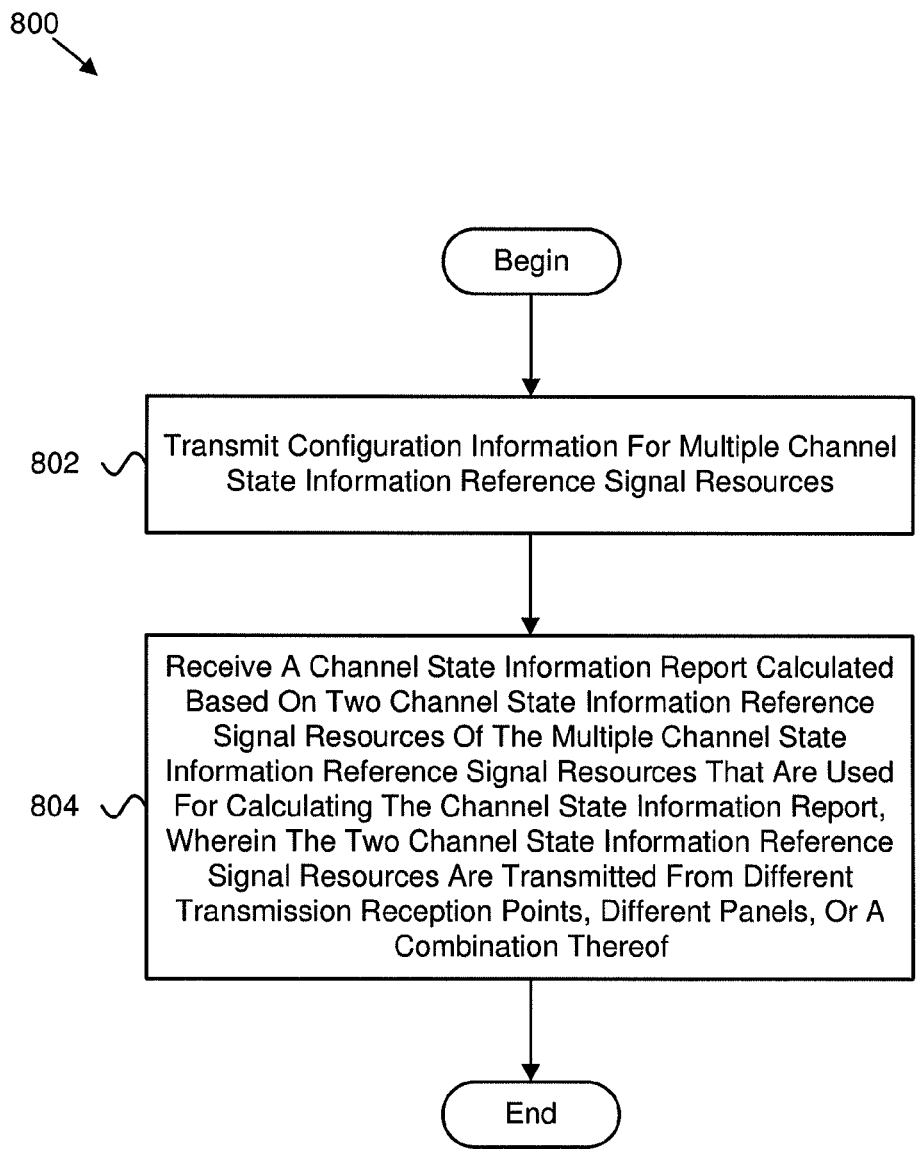
FIG. 8 is a schematic flow chart diagram illustrating one embodiment of a method for receiving a channel state information report.

FIG. 8 is a schematic flow chart diagram illustrating one embodiment of a method 800 for receiving a channel state information report. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include transmitting 802 configuration information (e.g., QCL information, ExSets, CoSets, simultaneous transmission information) for multiple channel state information reference signal resources. In various embodiments, the method 800 includes receiving 804 a channel state information report calculated based on two channel state information reference signal resources of the multiple channel state information reference signal resources that are used for calculating the channel state information report. In such embodiments, the two channel state information reference signal resources are transmitted from different transmission reception points, different panels, or a combination thereof.

In one embodiment, the two channel state information reference signal resources are capable of being transmitted concurrently. In some embodiments, the method 800 includes transmitting information indicating which channel state information reference signal resources of the multiple channel state information reference signal resources are capable of being transmitted concurrently. In certain embodiments, channel state information reference signal resources of the multiple channel state information reference signal resources that are quasi co-located are capable of being transmitted concurrently.

In various embodiments, a first channel state information reference signal resource of the multiple channel state information reference signal resources that is quasi co-located with a second channel state information reference signal resource of the multiple channel state information reference signal resources inherits transmission properties of the second channel state information reference signal resource. In one embodiment, the method 800 includes transmitting information indicating at least one set of channel state information reference signal resources of the multiple channel state information reference signal resources that are capable of being transmitted concurrently. In some embodiments, the method 800 includes transmitting information indicating at least one set of channel state information reference signal resources of the multiple channel state information reference signal resources that are incapable of being transmitted concurrently.

In certain embodiments, the multiple channel state information reference signal resources are non-zero power channel state information reference signal resources. In various embodiments, the two channel state information reference signal resources are not quasi co-located with each other.

In one embodiment, a method comprises: receiving configuration information for a plurality of channel state information reference signal resources; determining two channel state information reference signal resources of the plurality of channel state information reference signal resources to be used for calculating a channel state information report, wherein the two channel state information reference signal resources are received from different transmission reception points, different panels, or a combination thereof; and transmitting the channel state information report calculated based on the two channel state information reference signal resources.

In some embodiments, determining the two channel state information reference signal resources comprises determining that the two channel state information reference signal resources are capable of being transmitted concurrently.

In certain embodiments, the method comprises receiving information indicating which channel state information reference signal resources of the plurality of channel state information reference signal resources are capable of being transmitted concurrently.

In various embodiments, determining the two channel state information reference signal resources comprises using quasi co-location information of the plurality of channel state information reference signal resources to determine transmission properties of the plurality of channel state information reference signal resources.

In one embodiment, channel state information reference signal resources of the plurality of channel state information reference signal resources that are quasi co-located are capable of being transmitted concurrently.

In some embodiments, a first channel state information reference signal resource of the plurality of channel state information reference signal resources that is quasi co-located with a second channel state information reference signal resource of the plurality of channel state information reference signal resources inherits transmission properties of the second channel state information reference signal resource.

In certain embodiments, the method comprises receiving information indicating at least one set of channel state information reference signal resources of the plurality of channel state information reference signal resources that are capable of being transmitted concurrently.

In various embodiments, determining the two channel state information reference signal resources comprises determining that the two channel state information reference signal resources are capable of being transmitted concurrently based on the at least one set of channel state information reference signal resources.

In one embodiment, the method comprises receiving information indicating at least one set of channel state information reference signal resources of the plurality of channel state information reference signal resources that are incapable of being transmitted concurrently.

In some embodiments, determining the two channel state information reference signal resources comprises determining that the two channel state information reference signal resources are capable of being transmitted concurrently based on the at least one set of channel state information reference signal resources.

In certain embodiments, the plurality of channel state information reference signal resources are non-zero power channel state information reference signal resources.

In various embodiments, the two channel state information reference signal resources are not quasi co-located with each other.

In one embodiment, an apparatus comprises: a receiver that receives configuration information for a plurality of channel state information reference signal resources; a processor that determines two channel state information reference signal resources of the plurality of channel state information reference signal resources to be used for calculating a channel state information report, wherein the two channel state information reference signal resources are received from different transmission reception points, different panels, or a combination thereof; and a transmitter that transmits the channel state information report calculated based on the two channel state information reference signal resources.

In some embodiments, the processor determines the two channel state information reference signal resources by determining that the two channel state information reference signal resources are capable of being transmitted concurrently.

In certain embodiments, the receiver receives information indicating which channel state information reference signal resources of the plurality of channel state information reference signal resources are capable of being transmitted concurrently.

In various embodiments, the processor determines the two channel state information reference signal resources by using quasi co-location information of the plurality of channel state information reference signal resources to determine transmission properties of the plurality of channel state information reference signal resources.

In one embodiment, channel state information reference signal resources of the plurality of channel state information reference signal resources that are quasi co-located are capable of being transmitted concurrently.

In some embodiments, a first channel state information reference signal resource of the plurality of channel state information reference signal resources that is quasi co-located with a second channel state information reference signal resource of the plurality of channel state information reference signal resources inherits transmission properties of the second channel state information reference signal resource.

In certain embodiments, the receiver receives information indicating at least one set of channel state information reference signal resources of the plurality of channel state information reference signal resources that are capable of being transmitted concurrently.

In various embodiments, the processor determines the two channel state information reference signal resources by determining that the two channel state information reference signal resources are capable of being transmitted concurrently based on the at least one set of channel state information reference signal resources.

In one embodiment, the receiver receives information indicating at least one set of channel state information reference signal resources of the plurality of channel state information reference signal resources that are incapable of being transmitted concurrently.

In some embodiments, the processor determines the two channel state information reference signal resources by determining that the two channel state information reference signal resources are capable of being transmitted concurrently based on the at least one set of channel state information reference signal resources.

In certain embodiments, the plurality of channel state information reference signal resources are non-zero power channel state information reference signal resources.

In various embodiments, the two channel state information reference signal resources are not quasi co-located with each other.

In one embodiment, a method comprises: transmitting configuration information for a plurality of channel state information reference signal resources; and receiving a channel state information report calculated based on two channel state information reference signal resources of the plurality of channel state information reference signal resources that are used for calculating the channel state information report, wherein the two channel state information reference signal resources are transmitted from different transmission reception points, different panels, or a combination thereof.

In some embodiments, the two channel state information reference signal resources are capable of being transmitted concurrently.

In certain embodiments, the method comprises transmitting information indicating which channel state information reference signal resources of the plurality of channel state information reference signal resources are capable of being transmitted concurrently.

In various embodiments, channel state information reference signal resources of the plurality of channel state information reference signal resources that are quasi co-located are capable of being transmitted concurrently.

In one embodiment, a first channel state information reference signal resource of the plurality of channel state information reference signal resources that is quasi co-located with a second channel state information reference signal resource of the plurality of channel state information reference signal resources inherits transmission properties of the second channel state information reference signal resource.

In some embodiments, the method comprises transmitting information indicating at least one set of channel state information reference signal resources of the plurality of channel state information reference signal resources that are capable of being transmitted concurrently.

In certain embodiments, the method comprises transmitting information indicating at least one set of channel state information reference signal resources of the plurality of channel state information reference signal resources that are incapable of being transmitted concurrently.

In various embodiments, the plurality of channel state information reference signal resources are non-zero power channel state information reference signal resources.

In one embodiment, the two channel state information reference signal resources are not quasi co-located with each other.

In one embodiment, an apparatus comprises: a transmitter that transmits configuration information for a plurality of channel state information reference signal resources; and a receiver that receives a channel state information report calculated based on two channel state information reference signal resources of the plurality of channel state information reference signal resources that are used for calculating the channel state information report, wherein the two channel state information reference signal resources are transmitted from different transmission reception points, different panels, or a combination thereof.

In some embodiments, the two channel state information reference signal resources are capable of being transmitted concurrently.

In certain embodiments, the transmitter transmits information indicating which channel state information reference signal resources of the plurality of channel state information reference signal resources are capable of being transmitted concurrently.

In various embodiments, channel state information reference signal resources of the plurality of channel state information reference signal resources that are quasi co-located are capable of being transmitted concurrently.

In one embodiment, a first channel state information reference signal resource of the plurality of channel state information reference signal resources that is quasi co-located with a second channel state information reference signal resource of the plurality of channel state information reference signal resources inherits transmission properties of the second channel state information reference signal resource.

In some embodiments, the transmitter transmits information indicating at least one set of channel state information reference signal resources of the plurality of channel state information reference signal resources that are capable of being transmitted concurrently.

In certain embodiments, the transmitter transmits information indicating at least one set of channel state information reference signal resources of the plurality of channel state information reference signal resources that are incapable of being transmitted concurrently.

In various embodiments, the plurality of channel state information reference signal resources are non-zero power channel state information reference signal resources.

In one embodiment, the two channel state information reference signal resources are not quasi co-located with each other.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving configuration information for a plurality of channel state information (CSI) reference signal (RS) (CSI-RS) resources;
   determining two CSI-RS resources of the plurality of CSI-RS resources to be used for calculating a CSI report, wherein the two CSI-RS resources are received from different transmission reception points, different panels, or a combination thereof; and
   transmitting the CSI report calculated based on the two CSI-RS resources, wherein the CSI report comprises a joint CSI calculated using a first CSI resource indicator (CRI) corresponding to a first CSI-RS of the two CSI-RS and a second CRI corresponding to a second CSI-RS of the two CSI-RS.

2. The method of claim 1, wherein determining the two CSI-RS resources comprises determining that the two CSI-RS resources are capable of being transmitted concurrently.

3. The method of claim 2, further comprising receiving information indicating which CSI-RS resources of the plurality of CSI-RS resources are capable of being transmitted concurrently.

4. The method of claim 1, wherein determining the two CSI-RS resources comprises using quasi co-location (QCL) information of the plurality of CSI-RS resources to determine transmission properties of the plurality of CSI-RS resources.

5. The method of claim 1, wherein CSI-RS resources of the plurality of CSI-RS resources that are quasi co-located (QCL) are capable of being transmitted concurrently.

6. The method of claim 1, wherein a first CSI-RS resource of the plurality of CSI-RS resources that is quasi co-located (QCL) with a second CSI-RS resource of the plurality of CSI-RS resources inherits transmission properties of the second CSI-RS resource.

7. The method of claim 1, further comprising receiving information indicating at least one set of CSI-RS resources of the plurality of CSI-RS resources that are capable of being transmitted concurrently.

8. The method of claim 7, wherein determining the two CSI-RS resources comprises determining that the two CSI-RS resources are capable of being transmitted concurrently based on the at least one set of CSI-RS resources.

9. The method of claim 1, further comprising receiving information indicating at least one set of CSI-RS resources of the plurality of CSI-RS resources that are incapable of being transmitted concurrently.

10. The method of claim 9, wherein determining the two CSI-RS resources comprises determining that the two CSI-RS resources are capable of being transmitted concurrently based on the at least one set of CSI-RS resources.

11. The method of claim 1, wherein the plurality of CSI-RS resources are non-zero power CSI-RS resources.

12. The method of claim 1, wherein the two CSI-RS resources are not quasi co-located (QCL) with each other.

13. A user equipment (UE), comprising:
    at least one memory; and
    at least one processor coupled with the at least one memory and configured to cause the UE to:
       receive configuration information for a plurality of channel state information (CSI) reference signal (RS) (CSI-RS) resources;
       determine two CSI-RS resources of the plurality of CSI-RS resources to be used for calculating a CSI report, wherein the two CSI-RS resources are received from different transmission reception points, different panels, or a combination thereof; and
       transmit the CSI report calculated based on the two CSI-RS resources, wherein the CSI report comprises a joint CSI calculated using a first CSI resource indicator (CRI) corresponding to a first CSI-RS of the two CSI-RS and a second CRI corresponding to a second CSI-RS of the two CSI-RS.

14. A method performed by a base station, the method comprising:
    transmitting configuration information for a plurality of channel state information (CSI) reference signal (RS) (CSI-RS) resources; and
    receiving a CSI report calculated based on two CSI-RS resources of the plurality of CSI-RS resources that are used for calculating the CSI report, and the CSI report comprises a joint CSI calculated using a first CSI resource indicator (CRI) corresponding to a first CSI-RS of the two CSI-RS and a second CRI corresponding to a second CSI-RS of the two CSI-RS, wherein the two CSI-RS resources are transmitted from different transmission reception points, different panels, or a combination thereof.

15. The method of claim 14, wherein the two CSI-RS resources are capable of being transmitted concurrently.

16. The method of claim 15, further transmitting information indicating which CSI-RS resources of the plurality of CSI-RS resources are capable of being transmitted concurrently.

17. The method of claim 14, wherein CSI-RS resources of the plurality of CSI-RS resources that are quasi co-located (QCL) are capable of being transmitted concurrently.

18. The method of claim 14, wherein a first CSI-RS resource of the plurality of CSI-RS resources that is quasi co-located (QCL) with a second CSI-RS resource of the plurality of CSI-RS resources inherits transmission properties of the second CSI-RS resource.

19. The method of claim 14, further comprising transmitting information indicating at least one set of CSI-RS resources of the plurality of CSI-RS resources that are capable of being transmitted concurrently.

20. A base station, comprising:
    at least one memory; and
    at least one processor coupled with the at least one memory and configured to cause the base station to:
       transmit configuration information for a plurality of channel state information (CSI) reference signal (RS) (CSI-RS) resources; and a CSI report calculated based on two CSI-RS resources of the plurality of CSI-RS resources that are used for calculating the CSI report, and the CSI report comprises a joint CSI calculated using a first CSI resource indicator (CRI) corresponding to a first CSI-RS of the two CSI-RS and a second CRI corresponding to a second CSI-RS of the two CSI-RS, wherein the two CSI-RS resources are transmitted from different transmission reception points, different panels, or a combination thereof.

* * * * *